Figure 1:
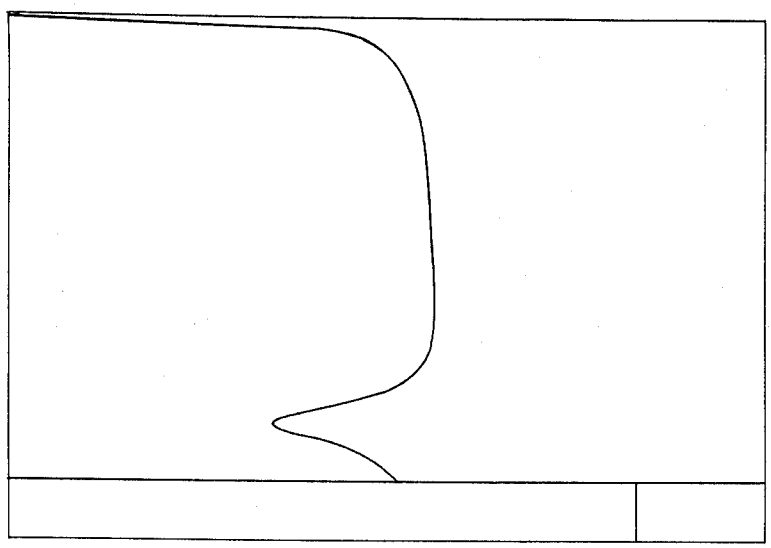

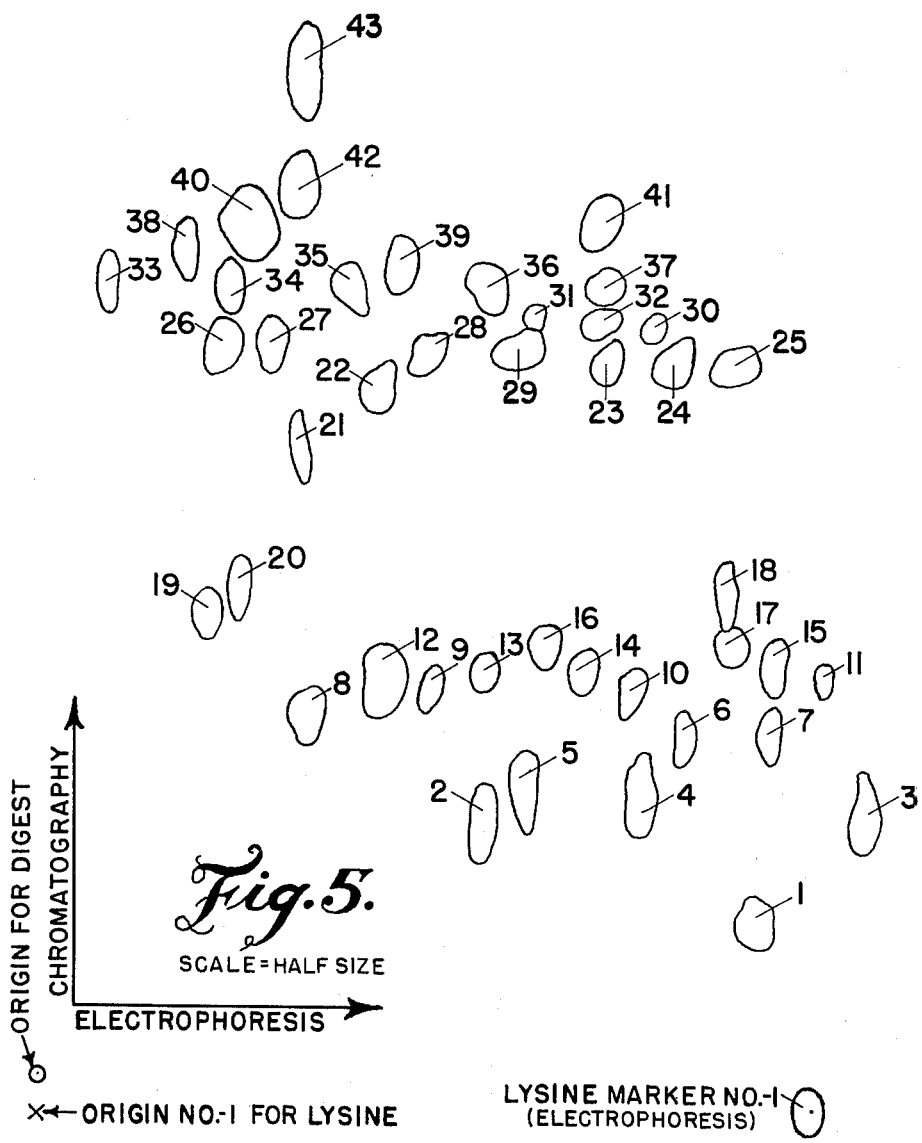

United States Patent Office 3,226,304
Patented Dec. 28, 1965

3,226,304
HIGH PURITY STREPTOKINASE AND PROCESS FOR PREPARING SAME
Pentti Kasper Siiteri, Hillsdale, N.J., and Richard Douglas Mills, Pearl River, N.Y., assignors to American Cyanamid Company, New York, N.Y., a corporation of Maine
Filed Oct. 24, 1960, Ser. No. 64,655
4 Claims. (Cl. 195—62)

This invention relates to high purity streptokinase, and a process for preparing same and a process for the effective treatment of thromboembolic disease in man involving the intravenous administration of same.

This application is a continuation-in-part of our copending application Serial No. 711,867, filed Jan. 29, 1958, now abandoned.

As is well known, human blood contains certain factors which promote its coagulation when it is removed from the human circulatory system. It is generally held that blood within the vascular system also coagulates at a very small rate with the production of blood clots or fibrin which are normally dissolved and removed by virtue of the presence of the fibrinolytic enzyme plasmin. Plasmin is a naturally occurring enzyme and is normally produced as needed in the vascular system from its precursor, plasminogen, through the action of activating agents normally present in the blood. Excessive production of fibrin beyond the capacity of the normally occurring plasmin results in the condition known as thrombosis. Thrombosis is a physiological abnormality in which blood clots block or at least retard the flow of blood through the circulatory system. Thrombosis, as is known, may be treated by anti-coagulants, such as heparin, but these are preventative agents and are believed to have little effect on the blood clot once it has formed. Trypsin, a proteolytic enzyme, has been used parenterally for the dissolution of fibrin but only with limited success. It is believed by leading investigators that the use of trypsin for this purpose is not entirely safe.

Streptokinase a substance capable of activating plasminogen to plasmin which has fibrinolytic activity, is produced by many strains of hemolytic streptococci, chiefly those of Group A and Lancefield Group C stretpococci. Tillet et al. (J. Clin. Invest., 34, 169, 1955) and Tagnon (Practitioner, vol. 174, pages 95–102, 1955) have speculated on the potential value of streptokinase as an agent for dissolving blood clots. Streptokinase, however, in the form in which it has been heretofore available has not been suitable for this purpose because of the development of hypotension, of severe pyrogenic reactions and of general malaise that ensue following parenteral use in the size dosage needed for effective performance. Tagnon inferred that if the toxic properties could be removed from this streptokinase it might well become the agent of choice. In contrast to this optimistic evaluation is the view held heretofore by other investigators as influenced by the work of Kellner and Robertson (J. Exp. Med. 99, 387–404, 1954) whose substantial infusion of streptokinase into rabbits caused severe cardiac damage. The fear in some quarters, therefore, was that it was perfectly possible that streptokinase itself even in the purest form might cause toxic reaction such as to prohibit its parenteral use, particularly intravenous administration. Thus the effective separation of the active principle, i.e., the substance streptokinase per se, from non-streptokinase components was the problem. Lack of solution of this problem had heretofore prevented decisive exploration of the use of streptokinase in the effective treatment of intravascular thrombosis.

We have now discovered that a very high purity streptokinase type material can be prepared and by a feasible and reproducible method, and further that unexpectedly this material may be injected intravenously in effective amounts without untoward toxic reaction, and that it is useful for the dissolution of blood clots in the vascular system as part of therapy for thrombic disease. This material is believed to offer a new and outstanding approach to treatment of this type diease, an approach not offered by heretofore available streptokinase or other type materials.

The principle forms in which streptokinase has heretofore been available are described below.

One of the heretofore available streptokinase preparations has been the so-called commercial streptokinase-streptodornase mixture which is the type prepared in accordance with the teachings of the following U.S. Patents: 2,701,227 to Ablondi and Adam, 2,702,781 to Hawkins, 2,677,642 to Ablondi and Nalesnyk, 2,677,643 to Ablondi and Nalesnyk and 2,691,620 to Ablondi and Querry. Commercial streptokinase-streptodornase has been available as a mixture assaying about 80 streptokinase units per gamma of nitrogen and at least 20 streptodornase units per gamma of nitrogen, streptodornase comprising a group of enzymes capable of causing the deploymerization of desoxyribonucleic acid, a major constituent of pus. Thus streptodornase represents a relatively rich secondary component in the streptokinase-streptodornase mixture. In addition, this commercial mixture contains some eleven or twelve minor antigenic components, which minor component were believed not necessarily to be at least the partial cause for the toxic reactions referred to herein above. The streptokinase-streptodornase mixture, as exemplified by a typical batch, when examined in the ultracentrifuge for sedimentation rate under standard conditions, hereinbelow described in more detail, proves to be a rather heterogeneous composition as may be noted from FIGURE 3, a reproduction of a photograph taken within ultracentrifuge. Commercial streptokinase-streptadornase cannot be parenterally administered except at low streptokinase activity dosage levels. High dosage levels which might be effective in dissolving blood clots, unfortunately, cause severe toxic reactions.

Figure 3:
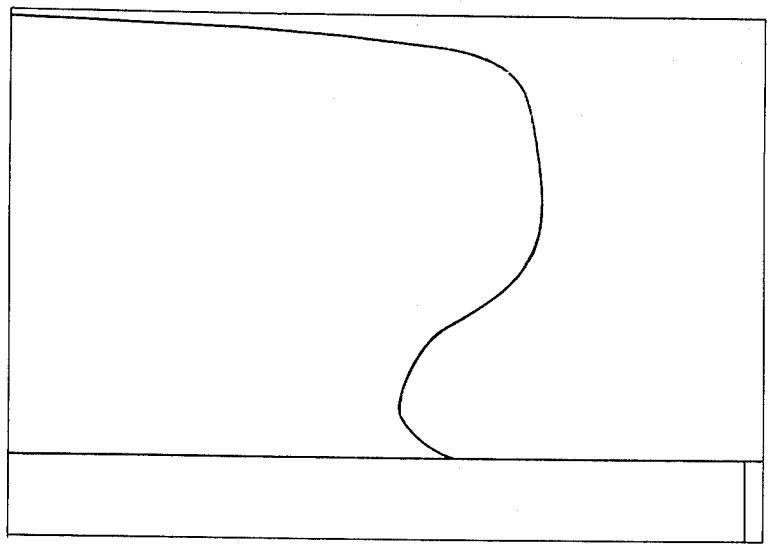
Figure 4:
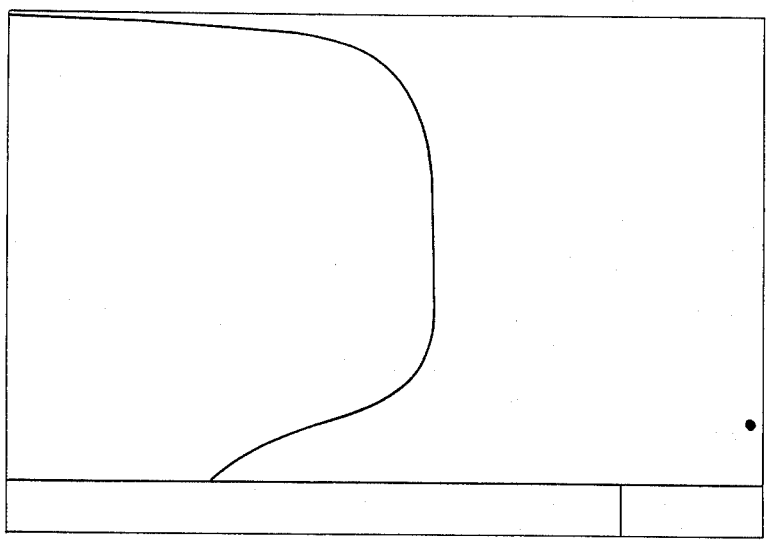

Another heretofore available streptokinase preparation is the product obtained by the process outlined in U.S. Patent 2,784,145 issued to Ablondi and Mills. As therein described an improvement in purity was achieved by contacting the fermentation mash obtained by cultivation of the above referred to beta hemolytic streptococci with an activated magnesium silicate for the purpose of adsorbing the streptokinase activity thereon, after which this activity is eluted therefrom by aqueous, alkaline solution and recovering the higher purity streptokinase material therefrom by conventional means. The thus-prepared streptokinase material while higher in streptokinase activity than the commercial streptokinase-streptodornase product referred to hereinabove and while appreciably reduced as to streptodornase content, is not suitable for intravenous administration in effective amounts and is a heterogeneous material as is evidenced by the character of its ultracentrifuge sedimentation curve as shown in FIGURE 4, the curve having been prepared in the same manner as was the curve for FIGURE 3. The above referred to standard conditions under which the sedimentation rate was studied in the ultra-centrifuge to form the basis for FIGURES 3 and 4 are as follows: The streptokinase preparations were each dissolved in phosphate buffer of pH 7.5 and an ionic strength of 0.15. The apparatus used was a Spinco Model E ultra centrifuge equipped with a phase plate and cylindrical lens. The dissolved samples were centrifuged at 59,780 r.p.m. for at least 56 minutes. Photographs of the meniscus were taken at eight minute intervals beginning when the rotor of the centrifuge reached 59,780 r.p.m. FIGURES 3 and 4 are reproductions of photographs taken at 72 minutes and 32 minutes, respectively, after the rotor reached 59,780 r.p.m. In summary, the prior art products as exemplified by FIGURES 3 and 4 are essentially heterogeneous in nature and are not suitable for intravenous therapy in the dissolution of intravascular blood clots.

Figure 2:
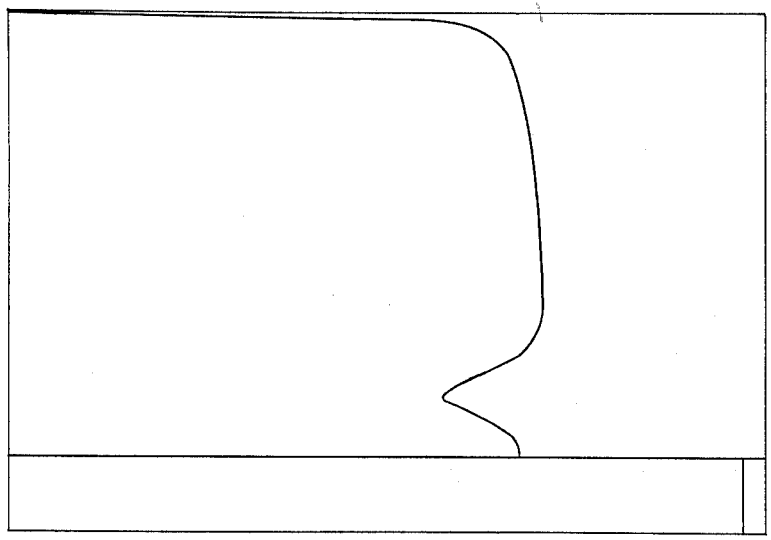

The high purity streptokinase of our invention has, among other distinguishing characteristics, the following physical constants as measured in phosphate buffer of pH 7.5 and an ionic strength of 0.15: a molecular weight of about 47,000, a sedimentation rate constant ($S_{20°}$ value) of about $3.0 \times 10^{-13}$, a diffusion constant ($D_{20°}$ value) of about $6.20 \times 10^{-7}$ and an electrophoretic mobility ($\mu$) of about $4.19 \times 10^{-5} cm.^2 sec.^{-1} volt^{-1}$. Reasonable variations from the above values may be expected between various batches of this material when prepared by the process of our invention as outlined herein below. For instance, it is to be expected that the sedimentation rate constant may vary within the range of $3.00 \pm 0.10 \times 10^{-13}$, the diffusion constant within the range of $$6.20 \pm 0.20 \times 10^{-7}$$

and the molecular weight between $47,000 \pm 2,000$. The sedimentation analyses are based on the use of a Spinco Model E ultracentrifuge equipped with a phase plate and cylindrical lens. The samples are centrifuged at 59,780 r.p.m. for at least 56 minutes and photographs of the meniscus are taken at eight minute intervals beginning when the rotor reaches that r.p.m. FIGURES 1 and 2 are reproductions of photographs taken in the ultracentrifuge during the respective sedimentation analyses of the products of Examples 1 and 2. The photographs were taken 32 minutes after the rotor reached 59,780 r.p.m. Electrophoretic mobilities are based on the use of a Spinco Model H apparatus equipped with a Schlieren diaphragm and cylindrical lens. Diffusion constants are measured in the same apparatus as used for the electrophoretic mobility determination.

The high purity streptokinase of our invention may also be characterized by subjecting it to two-dimensional chromatography and electrophoresis after digestion with proteolytic enzymes as described by Katz et. al., J. Biol. Chem. 234, 2897–2900, November 1959. The method of Katz et. al., broadly speaking, depends upon digesting the protein in question with trypsin or other suitable proteolytic enzymes, under carefully controlled conditions, after which the peptide-type digestion products are spotted on suitable chromatographic paper for successive chromatography and electrophoresis. By such a procedure peptide patterns are obtained which are so characteristic of individual proteins as to be "finger prints" thereof. In detail, the method may be described briefly as follows: A solution containing 1 mg. highly purified streptokinase per ml. and 20 micrograms per ml. of twice crystallized trypsin (Worthington Biochemicals) in 0.2M ammonium bicarbonate, pH 8.5, is digested at 37° for twenty-two hours. Toluene is layered on the surface of the reaction mixture in order to exclude bacterial contamination. Twenty micrograms of 3 times crystallized α-chymotrypsin (Worthington Chymotrypsin I) are added per ml. of reaction mixture and the digestion continued for an additional 18 hours. At the end of the reaction the digest is lyophilized and one to two mg. dissolved in a solution containing 5 parts n-butanol, 2 parts glacial acetic acid and 3 parts water and applied in one corner of Whatman #3 paper for chromatography. Chromatography is carried out for about 18 hours in the descending manner in the standard way in the solvent employed to dissolve the lyophilized digestion products. At the end of the chromatographic step the paper is air dried and then oven dried at 80° C. for 15–20 minutes. In order to serve as standards of comparison for electrophoretic migration distances about 50 micrograms of lysine (dissolved in the buffer employed in electrophoresis, see below) are then spotted on the dried paper next to the point of origin and next to the solvent front on the chromatographed peptide line. The paper is then turned through an angle of 90° and inserted into a modified Michl electrophoretic apparatus as described by Katz et. al. Electrophoresis is carried out for 120 minutes at 2,000 volts with a current between 70–90 milliamperes in a buffer composed of 1 part pyridine, 10 parts glacial acetic acid and 289 parts water, pH 3.7. At the end of the electrophoresis the paper is carefully removed, dried in air and then in an oven at 80° for 30 minutes. The peptide spots are stained by passing the paper through a solution of 0.5% ninhydrin in absolute acetone followed by heating in an oven for 20 minutes at 80° C. The use of other staining agents, however, is not precluded. FIGURE 5 shows the pattern obtained by the above techniques when applied to the high purity streptokinase of our invention. Table 1 shows the data, expressed in terms of $R_f$ and in terms of electrophoretic mobility in comparison to lysine, corresponding to the spots shown in FIGURE 5.

TABLE 1

*Average $R_f$ values and average electrophoretic mobility values for peptides obtained by proteolytic digestion of high purity streptokinase*

| Spot No. | $R_f$ Value | Mobility Peptide Migration Distance / Lysine Migration Distance |
|---|---|---|
| 1 | 0.13 | 0.93 |
| 2 | 0.22 | 0.58 |
| 3 | 0.22 | 1.07 |
| 4 | 0.24 | 0.75 |
| 5 | 0.25 | 0.63 |
| 6 | 0.29 | 0.84 |
| 7 | 0.29 | 0.95 |
| 8 | 0.31 | 0.35 |
| 9 | 0.33 | 0.51 |
| 10 | 0.33 | 0.77 |
| 11 | 0.34 | 1.02 |
| 12 | 0.34 | 0.45 |
| 13 | 0.35 | 0.58 |
| 14 | 0.35 | 0.71 |
| 15 | 0.35 | 0.96 |
| 16 | 0.37 | 0.66 |
| 17 | 0.37 | 0.90 |
| 18 | 0.41 | 0.89 |
| 19 | 0.40 | 0.22 |
| 20 | 0.42 | 0.26 |
| 21 | 0.54 | 0.34 |
| 22 | 0.59 | 0.44 |
| 23 | 0.61 | 0.74 |
| 24 | 0.61 | 0.82 |
| 25 | 0.61 | 0.90 |
| 26 | 0.63 | 0.23 |
| 27 | 0.63 | 0.30 |
| 28 | 0.62 | 0.50 |
| 29 | 0.62 | 0.62 |
| 30 | 0.64 | 0.80 |
| 31 | 0.65 | 0.64 |
| 32 | 0.65 | 0.73 |
| 33 | 0.68 | 0.09 |
| 34 | 0.68 | 0.24 |
| 35 | 0.68 | 0.40 |
| 36 | 0.68 | 0.58 |
| 37 | 0.68 | 0.73 |
| 38 | 0.71 | 0.19 |
| 39 | 0.70 | 0.47 |
| 40 | 0.73 | 0.27 |
| 41 | 0.73 | 0.71 |
| 42 | 0.76 | 0.33 |
| 43 | 0.86 | 0.34 |

The method combining two-dimensional chromatography and electrophoresis described above has been used by other investigators to unequivocally distinguish between proteins which differ only in the content of a single amino acid [See e.g. Hunt and Ingram, Biochimica et Biophysica Acta 42, 409 (1960) and Ingram, Biochimica et Biophysica Acta 36, 402 (1959)]. Basic to the "fingerprinting" of a protein by this procedure, is the specificity of attack of the proteolytic enzymes for certain groupings within the protein molecule which, in turn, depend upon the specific sequence of amino acids within the molecule. Thus, a highly specific "fingerprint" of a given protein is obtained which is characteristic of that particular protein molecule.

The high purity streptokinase of our invention may also be characterized as to amino acid composition by the procedure described by Spackman, Stein and Moore, Analytical Chemistry, vol. 30, pgs. 1185 to 1206 (1958) and by Stein and Moore, J. Biological Chemistry, vol. 192, pgs. 663–681 (1951). By this method the quantitative estimation of the amino acids present in a protein is determined by quantitative ion-exchange chromatographic analysis of an hydrolysate of the protein. An acid hydrolyzed sample of the protein is used for quantitative determination of all amino acids except tryptophan. An alkaline hydrolyzed sample of the protein is used for the latter purpose. When the high purity streptokinase of our invention is subjected to the aforesaid procedure of Spackman et al. results are obtained as shown in Table 2.

TABLE 2

Quantitative amino acid composition of high purity streptokinase*

| Amino Acid | Number of Residues per Mole of Streptokinase | Percent of Total Protein Nitrogen |
| --- | --- | --- |
| Lysine | 32 | 11.03±0.55 |
| Histidine | 9 | 4.65±0.51 |
| Arginine | 20 | 13.79±0.83 |
| Aspartic acid | 67 | 11.55±0.31 |
| Threonine | 29 | 5.00±0.16 |
| Serine | 21 | 3.62±0.09 |
| Glutamic acid | 45 | 7.76±0.16 |
| Proline | 22 | 3.79±0.09 |
| Glycine | 21 | 3.62±0.10 |
| Alanine | 24 | 4.14±0.09 |
| Cysteine | 1 | 0.17±0.003 |
| Valine | 23 | 3.96±0.11 |
| Methionine | 4 | 0.69±0.015 |
| Isoleucine | 23 | 3.97±0.055 |
| Leucine | 40 | 6.90±0.14 |
| Tyrosine | 21 | 3.62±0.11 |
| Phenylanine | 14 | 2.41±0.034 |
| Tryptophane | 1 | 0.35±0.004** |
| Amide ammonia | 52 | 8.97±0.82 ** |

*The precision of these results is based on the published values of Moore and Stein, J. Biological Chemistry, 192, 663 (1951) except for tryptophan and amide ammonia (see below).

**Precision is based on data obtained with high purity streptokinase.

On the basis of the average amino acid analysis described immediately above the empirical formula for the high purity streptokinase of our invention is:

$$C_{2104} H_{3301} N_{580} O_{660} S_5$$

thereby giving a theoretical percentage analysis of 53.25 (carbon), 7.01 (hydrogen), 17.12 (nitrogen), 22.29 (oxygen) and 0.34 (sulfur) and, consequently, a theoretical carbon/nitrogen (C/N) ratio of 3.11. Actual analysis gives a percentage analysis, when corrected for water of hydration and ash, of 54.00 (carbon), 9.21 (hydrogen) and 17.36 (nitrogen), and consequently an actual carbon/nitrogen (C/N) ratio of 3.11.

Infra-red analysis of the high purity streptokinase of our invention using a KBr disc yields an absorption pattern having absorption bands expressed in microns at 3.03; 3.24; 3.37; 6.05; 6.5; 6.9; 7.18 and 8.10.

Analysis of the high purity streptokinase of our invention by determining its ultra-violet absorption spectrum yields the following results: When determined in 0.1 N HCl an absorption maximum is present at 276 mμ with an

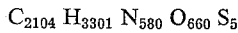

value of 8.0. When determined in 0.1 N NaOH an absorption maximum appears at 290 mμ with an $E^{1\%}_{1\,cm.}$ value of 11.0.

The high purity streptokinase of our invention is an amorphous solid and is soluble in water. It may, therefore, be readily dissolved in water to form solutions for intravenous use. Preservatives, coloring agents and other non-toxic pharmaceutical carriers or diluents may be added as necessary. The high purity streptokinase of our invention assays in terms of Streptokinase Units (see the method of Christensen, J. Clin. Invest. 1949, v. 28, 163) about 600 units per gamma of nitrogen and according to measurements by the method of Ouchterlony (Acta path. et microbiol., Scandinav., 1948, v. 25, 186) would seem to comprise in addition to streptokinase two very minor components of unknown description.

The high purity streptokinase of our invention may be administered intravenously to human beings in doses ranging between 50,000 and 100,000 units of streptokinase per hour per patient. At least 4,000,000 units may be administered during the period of therapy, with no change in blood pressure and only an occasional mild pyrogenic reaction that can be blocked readily by anti-pyretic medication. The high purity streptokinase of our invention is useful in curing thrombic disorders in general, among such disorders being thrombophlebitis, ileo femoral thrombosis and pulmonary embolus blocks.

The process of our invention is based on the general principle of adsorption chromatography as applied to anion exchange column adsorbants. The column adsorbants may be prepared from commercial cellulose by the successive steps of treating it with alkali to render it more reactive and treating the activated cellulose with an aqueous solution of a reactive amine to provide for ionizable substituent groups being attached to the cellulose moiety by way of ether linkages. For example, the reactive amine may be 2-chlorotriethylamine. The modified cellulose thus obtained is washed in turn with mild aqueous alkali solution, mild aqueous acid solution, again with mild aqueous alkali solution and finally with water. The nitrogen content (Dumas Method) of the resultant water washed and dried modified cellulose is of the order of about 1% nitrogen, although any such product assaying between 0.7 and 1.5% N may be used satisfactorily. The modified cellulose material may be further characterized by its ion exchange capacity as determined by direct titration against standard hydrochloric acid solution. For instance a normal product of this type will titrate about 0.71 milliequivalents per gram of the modified cellulose. The modified cellulose may be used in columns of from 1 cm. and greater in diameter with the height of the column bed being approximately 10 to 15 times its diameter. Before the modified cellulose is put in the column, however, it is conditioned by slurrying in water and adjusting the pH thereof to an arbitrary value with an aqueous acidic reagent. It is then further conditioned by washing with buffer solution of the same arbitrary pH. The buffered cellulose slurry is poured into the column, allowed to settle by gravity and finally packed with the aid of compressed air. The column is then ready for use.

A solution of crude streptokinase material that has been dialyzed against a portion of the identical buffer solution used in the conditioning of the modified cellulose is now placed on top of the column bed and allowed to flow into the column by gravity. After the streptokinase solution has completely flowed into the column bed an arbitrary amount of the same buffer solution is placed on top of the column bed to provide a head of fluid above the column bed. Simultaneously, the desorption of the adsorbed streptokinase activity is begun by means of standard elution technique whereby a buffer is introduced at the top of the column and the effluent from the column is collected in successive fractions. As this buffer flows through the column, the streptokinase activity moves down the column and finally is recovered from the bottom of the column in the form of a dilute aqueous solution. It is necessary, in order to obtain a streptokinase product of optimum purity, the repeat the above elution process once more. In order to repeat the process, the dilute solution of streptokinase material obtained from the bottom of the column must be treated with suitable precipitating agents in order to precipitate the streptokinase material. The precipitate is reconstituted to form a concentrated aqueous solution which is then dialyzed against a portion of the identical buffer solution that is used to condition the second modified cellulose column, whereupon the dialyzed solution is placed on top of the column bed of the second column and the elution technique is then repeated. The final dilute solution obtained from the bottom of the second column is treated by conventional precipitating agents to recover high purity streptokinase therefrom. It is preferable, as a form of insurance, to repeat the adsorption elution cycle twice more instead of once more, but this is really not necessary.

The type of buffer used to purify streptokinase by the above described two cycle process is very critical. We have found that only the phosphate type is suitable for our purpose.

The molarity of the phosphate buffer used to condition the column bed prior to commencement of elution is also critical, the permissable maximum value being 0.1M. Molarity greater than 0.1 will prevent proper adsorption of streptokinase activity by the modified cellulose bed and thereby result in improper separation of streptokinase from impurities associated therewith. Below 0.005M the streptokinase activity is not desorbed properly.

The pH of the phosphate buffer solution used to condition the modified cellulose column should be kept between about 5.8 and 8.5. Above about pH 8.5 the ionization characteristics of the modified cellulose are gradually suppressed and, consequently, the capacity of the cellulose to adsorb streptokinase is concomitanly suppressed. Below about pH 5.8 streptokinase itself tends to precipitate inasmuch as its isoelectric point is in that range.

The temperature range within which the elution technique described above may be applied successfully to crude streptokinase material is 0 to 10° C. The preferred range is 3 to 5° C. Above 10° C. denaturation of streptokinase appears to take place.

While as stated above that standard elution technique may be used, in a preferred embodiment of the process of our invention gradient elution is employed. As is well known, in gradient elution a buffer of gradually changing pH and/or molar strength is introduced into the column for purposes of elution.

The extent to which the molarity of the phosphate buffer solution may vary during the gradient elution process is considerable, a top value of about 0.4 being considered a practical upper limit. It must vary to some extent, however, in order for the process to be successful. The pH may vary from a preferred starting value of between 6.0 to 6.5 to about 8.5 on the high side and 5.8 on the low side, for the reasons outlined above concerning the pH limitations of the buffer solution used to condition the column at the outset. The flow rate through the column is not critical but a value recommended is 3 ml./sq. cm. of cross-sectional column area/hour.

As mentioned above, a two column elution process is considered essential for the preparation of the high purity streptokinase of our invention. In the case of the gradient elution it does not matter whether the elution is in the ascending order of pH or in descending order of pH, so long as one or the other style is used twice. In other words, any two-way combination is workable.

Regarding the starting material useful for the process of our invention, it is to be understood that the term "crude streptokinase" is meant streptokinase-bearing material such os ordinary commercially available streptokinase-streptodornase mixtures as well as the up-graded streptokinase material prepared by the process claimed in the aforesaid U.S. Patent 2,784,145 to Ablondi and Mills. Numerous other partially purified streptokinase preparations, such as those that would occur to one skilled in the art, would likewise be suitable starting materials for our process.

The following examples will serve to illustrate the scope of our invention with more particularity:

Example 1

137 gms. of crude streptokinase assaying about 80 streptokinase units per gamma of nitrogen were suspended in water and brought into solution by the addition of dilute sodium hydroxide. This solution was dialyzed against 0.05 sodium phosphate at pH 6.5 until the pH inside the dialyzing bag was 6.5. The solution was removed from the dialysis bag and a small amount of insoluble material was removed by centrifugation. The volume of this solution was 485 ml. and it contained 305 million streptokinase units. The dialyzed solution was divided into two equal portions and each portion was allowed to run by gravity into two identical columns prepared with a cellulose anion exchange which had been made by reacting cellulose with 2-chloro-triethylamine. These columns had an internal diameter of 3.7 cms. and the height of the column bed was approximately 40 cms. Gradient elution with increasing pH and molar strength was used to remove the streptokinase activity from the columns by the constant volume technique. Both mixing bottle and reservoir of the gradient device were of similar shape and cross sectional area. The mixing bottle contained 1800 mls. of 0.05M phosphate buffer at pH 6.5 and the reservoir contained 1800 mls. of solution which was 0.1M with respect to $Na_2HPO_4$ and 0.2M with respect to NaCl. The flow rate through the columns was approximately 3 ml./cm.$^2$/hr. The streptokinase rich fraction from each column contained approximately 145 million streptokinase units. Two additional columns were run in a similar manner starting with 180 gms. of crude streptokinase. The streptokinase rich fractions from these four columns were combined and the streptokinase was precipitated therefrom by the addition of 10% sodium chloride and adjustment of the pH of the solution to a value of 4.0.

The precipitated streptokinase was suspended in water and dissolved by the addition of dilute sodium hydroxide until the pH of the resulting solution was approximately 7.0. This solution was then dialyzed against 0.05M sodium phosphate buffer at pH 6.0. The dialyzed streptokinase solution, which contained 948 million streptokinase units, was divided into two equal portions and each portion placed on identical columns prepared with a cellulose anion exchanger which had been made by reacting cellulose with 2-chloro-triethylamine. The inside diameter of these columns was 3.7 cms. and the height of the column bed was approximately 56 cms.. Gradient elution of the streptokinase activity was achieved as above except that a decreasing pH and increasing molar strength were used. The mixing bottle contained 1900 ml. of a solution which was 0.2M with respect to $NaH_2PO_4$ and 0.2M with respect to sodium chloride. The flow rate through the columns was approximately 3.5 ml./cm.$^2$/hr. The effluent fractions, which contained the purified streptokinase, were combined and had a total of 511 million streptokinase units.

After the streptokinase was concentrated as described above the solution of streptokinase was dialyzed against 0.05M sodium phosphate at pH 5.8. The dialyzed solution was again divided into two equal portions and placed on two columns prepared as above. The inside diameter of these columns was 3.0 cms. and the height of the column bed was approximately 48 cms. Elution of streptokinase activity was achieved as above using a decreasing pH gradient. The mixing bottle contained 1800 ml. of .05M sodium phosphate at pH 5.8 and the reservoir contained 1800 ml. of a solution that was 0.1M with respect to $NaH_2PO_4$ and 0.2M with respect to sodium chloride. The flow rate through these columns was approximately 4 ml./cm.²/hr. The streptokinase rich fractions were again combined and found to contain 377 million streptokinase units. The combined fractions were lyophilized yielding a dry product assaying 575 streptokinase units per gamma of nitrogen. The product was assigned the lot number 1747–C–162. It proved to have the following physical constants: a sedimentation rate constant ($D_{20°}$ value) of $2.98 \times 10^{-13}$, a diffusion constant ($D_{20°}$ value) of $6.14 \times 10^{-7}$, an electrophoretic mobility ($\mu$ of $4.19 \times 10^{-5}$cm.²sec.⁻¹volt⁻¹ and a molecular weight of 47,600. A photograph taken in the ultracentrifuge 32 minutes after the rotor speed had attained an r.p.m. of 59,780 may be noted in reproduction form as FIGURE 1. Lot 1747–C–162 was subsequently divided into portions. Two portions were submitted for clinical trial, one portion being identified by the clinical code number of 7–1212–21A while another portion was identified as 7–1212–22A. Combined clinical reports indicated that this product was well tolerated by patients and was effective for the treatment of thrombosis, being administered by the intravenous route.

*Example 2*

Lot 3459–B–62–X of high purity streptokinase was prepared in this example by an essentially identical procedure as in Example 1, except that the crude streptokinase starting material assayed 100 instead of 80 streptokinase units per gamma of nitrogen. The product had a sedimentation rate constant ($S_{20°}$ value) of $3.08 \times 10^{-13}$, a diffusion constant ($D_{20°}$ value) of $6.35 \times 10^{-7}$ and a molecular weight of 47,000. A photograph taken in the ultracentrifuge 32 minutes after the rotor speed had attained an r.p.m. of 59,780 may be noted in reproduction form as FIGURE 2. The final product assayed 615 streptokinase units per gamma of nitrogen.

*Example 3*

34 gms. of crude streptokinase assaying 100 streptokinase units per gamma of nitrogen were purified by batch-wise adsorption and elution at pH 7.0 from a modified cellulose anion exchanger, the exchanger as fully described in Example 1. Further purification of this partially purified streptokinase was achieved by gradient elution chromatography on the same type of modified cellulose as follows: A solution of the partially purified streptokinase was dialyzed against 0.075M sodium phosphate at pH 6.0 and then allowed to flow into a column of cellulose anion exchanger. The inside diameter of this column was 3.7 cm. and the height of the column was 55 cms. Gradient elution of the streptokinase was achieved by a system in which the mixing bottle contained 2000 ml. of 0.075M sodium phosphate at pH 6.0 and the reservoir contained 200 ml. of a solution that was 0.2M with respect to both $NaH_2PO_4$ and NaCl. The eluted streptokinase was concentrated as usual and then dialyzed against 0.095M sodium phosphate at pH 6.8. This solution was then flowed into a second column of cellulose anion exchanger which had an internal diameter of 2.9 cm. and a bed height of 38 cm. Then 25 ml. of 0.095M, pH 6.8 sodium phosphate buffer was run into the column and gradient elution then started in which the mixing bottle contained 1000 ml. of 0.095M, pH 6.8 sodium phosphate and the reservoir contained 1000 ml. of a solution 0.2M in both $NaH_2PO_4$ and NaCl. The streptokinase-rich elution fractions were collected and lyophylized, giving a final product assaying 605 streptokinase units per gamma of nitrogen and proving to have a sedimentation rate constant ($S_{20°}$ value) of $2.9 \times 10^{-13}$. The product was assigned the clinical code number 7–1212–14A. Results of clinical trials on this product indicated that it was well-tolerated by patients and that it was effective in the treatment of thrombosis, the administration being by the intravenous route.

*Example 4*

25 grams of crude streptokinase assaying about 150 streptokinase units per gamma of nitrogen were suspended in water and dissolved by the addition of dilute sodium hydroxide. This solution was dialyzed against 0.04M phosphate buffer, pH 7.0, until the pH inside the dialyzing bag was 7.0 and the phosphate buffer concentration was 0.04M. The volume of this solution was 70 ml. and it contained 122.6 million units of streptokinase. The dialyzed solution was allowed to run by gravity into a column of modified cellulose anion exchanger. The column had an internal diameter of 3.7 cms. and the height of the column bed was 46.0 cms. Elution of impurities was achieved by passing about 800 ml. of 0.075M phosphate buffer, pH 8.0, through the column, under which conditions the streptokinase is not yet desorbed. Flow rate was as described in previous examples. When the impurities were eluted the elution with 0.075M phosphate buffer was discontinued and elution of the streptokinase begun by flowing 0.1M phosphate buffer, pH 7.0 through the column. About 800 ml. of this buffer were used for elution. The streptokinase rich fraction containing 93 million units was collected. The 93 million units were concentrated by precipitation as described in the previous examples and dissolved in about 50 ml. of water by the addition of dilute sodium hydroxide, so that the pH was about 7.0. This solution was then dialyzed against 0.05M phosphate buffer, pH 7.0, prior to adding it to a column (40 cm. by 3.7 cm. i.d.) of modified cellulose exchanger also conditioned at pH 7.0 with 0.05M phosphate buffer. Elution of the streptokinase was accomplished by flowing about 800 ml. of 0.1M phosphate buffer, pH 7.0, through the column in the standard manner. The streptokinase rich fraction was collected. It contained 60 million units of streptokinase and assayed 610 units of streptokinase per gamma nitrogen. This final product was suitable for intravenous infusion in man for the purposes of this invention.

*Example 5*

25 grams of crude streptokinase assaying about 150 streptokinase units per gamma of nitrogen were suspended in water and dissolved by the addition of dilute sodium hydroxide. This solution was dialyzed against 0.04M phosphate buffer, pH 7.0, until the pH inside the dialyzing bag was 7.0 and the phosphate buffer concentration was 0.04M. The volume of this solution was 70 ml. and it contained 122.6 million units of streptokinase. The dialyzed solution was allowed to run by gravity into a column of modified cellulose anion exchanger. The column had an internal diameter of 3.7 cms. and the height of the column bed was 46.0 cms. Elution of impurities was achieved by passing about 800 ml. of 0.075M phosphate buffer, pH 8.0 through the column, under which conditions the streptokinase is not yet desorbed. Flow rate was as described in previous examples. When the impurities were eluted the elution with 0.075M phosphate buffer was discontinued and elution of the streptokinase begun by flowing 0.1M phosphate buffer, pH 7.0 through the column. About 800 ml. of this buffer were used for elution. The streptokinase rich fraction, containing 91 million units, was collected and concentrated by precipitation. 62 million units of this fraction were suspended in water and dissolved by the addition of dilute sodium hydroxide. The solution was dialyzed against 0.05M phosphate buffer, pH 5.8 in the usual manner. After dialysis the 30 ml. were added to a column of modified cellulose exchanger also conditioned at pH 5.8 with 0.05M phosphate buffer. The column size was 43 cm. by 1.95 cm. i.d. Gradient elution of the SK was accomplished in the manner described in previous examples, the elution buffers, consisting of equal volumes of 0.05M phosphate buffer, pH 5.8, and 0.1M $NaH_2PO_4$ containing 0.2M sodium chloride. The streptokinase rich fraction, containing 31.6 million units was collected. It assayed 605 streptokinase units per gamma of nitrogen. This final product was suitable for intravenous infusion in man for the purpose of this invention.

We claim:
1. High purity streptokinase effective for the treatment of thrombosis comprising a substance having
   (a) a molecular weight of about 47,000, a sedimentation rate constant ($S_{20°}$ value) of about $3.0 \times 10^{-13}$, a diffusion constant ($D_{20°}$ value) of about $6.20 \times 10^{-7}$ and an electro-phoretic mobility ($\mu$) of about $4.19 \times 10^{-5}$ cm.$^2$sec.$^{-1}$volt$^{-1}$, the preceding physical constants being measured in phosphate buffer of pH 7.5 and an ionic strength of 0.15,
   (b) the empirical formula $C_{2104}H_{3301}N_{580}O_{660}S_5$,
   (c) the respective carbon-hydrogen-nitrogen percentage analysis of 54.00–9.21–17.36,
   (d) the carbon to nitrogen (C/N) ratio of 3.11,
   (e) infra-red absorption bands (KB$r$ disk) in microns at 3.03; 3.24; 3.37; 6.05; 6.5; 6.9; 7.18 and 8.10 and
   (f) ultra-violet absorption maxima at 276 m$\mu$ (0.1 N HCl) with an
   $$E^{1\%}_{1\,cm.}$$
   value of 8.0 and at 290 m$\mu$ (0.1 N NaOH) with an
   $$E^{1\%}_{1\,cm.}$$
   value of 11.0;

displaying after subjection to controlled digestion by proteolytic enzymes a two-dimensional chromatographic and electrophoretic peptide pattern as in FIGURE 5; and displaying after subjection to complete hydrolysis a quantitative amino acid composition, expressed in terms of the percent nitrogen contributed by the individual amino acid residues of the total protein nitrogen, consisting of the following values: lysine, 11.03; histidine, 4.65; arginine, 13.79; aspartic acid, 11.55; threonine, 5.00; serine, 3.62; glutamic acid, 7.76; proline, 3.79; glycine, 3.62; alanine, 4.14; cysteine, 0.17; valine, 3.96; methionine, 0.69; isoleucine, 3.97; leucine, 6.90; tyrosine, 3.62; phenylalanine, 2.41; tryptophane, 0.35; amide ammonia, 8.97; said streptokinase being physiologically suitable for intravenous administration to human beings in an hourly dosage rate per person of at least about 50,000 S.K. units.

2. A process for preparing the product of claim 1 comprising the steps of adsorbing crude streptokinase on a cellulose amine anion exchanger chromatographic column, desorbing purified streptokinase therefrom by means of elution, adsorbing said purified streptokinase on a second cellulose amine anion exchanger chromatographic column, desorbing further purified streptokinase from said second column by means of elution, said preceding steps taking place in the presence of a phosphate buffer system having a pH value of not less than about 5.8 and not more than about 8.5, a temperature of not less than 0° C. and not more than 10° C. and a molarity of not less than about 0.005 and not more than about 0.1, and recovering said further purified streptokinase by conventional means.

3. A process for preparing the product of claim 1 comprising the steps of adsorbing crude streptokinase on a cellulose amine anion exchanger chromatographic column, desorbing purified streptokinase therefrom by means of gradient elution, adsorbing said purified streptokinase on a second cellulose amine anion exchanger chromatographic column, desorbing further purified streptokinase from said second column by means of gradient elution, said preceding steps taking place in the presence of a phosphate buffer system having a pH value of not less than about 5.8 and not more than about 8.5, a temperature of not less than 0° C. and not more than 10° C., a molarity of not less than about 0.005 and not more than about 0.1 during said adsorbing steps and a molarity of not less than about 0.005 during said desorbing steps, and recovering said further purified streptokinase by conventional means.

4. The process of claim 3 where said molarity is not less than about 0.005 and not more than about 0.4 during said desorbing steps and said temperature is not less than 3° C. and not more than 5° C.

References Cited by the Examiner
UNITED STATES PATENTS 2,784,145   3/1957   Ablondi et al. _____ 195—66

OTHER REFERENCES

American Druggist, 134 (12), pg. 36, December 1956.

Fletcher et al.: P.S.E.B.M., vol. 94, pp. 233–236, January 1957.

Hirs et al.: J. Biol. Chem., vol. 200, pp. 493–506, 1953.

Johnson et al.: Proc. Soc., Exper. Biol. and Med., 94, pp. 254–258, February 1957.

Johnson et al.: An. N.Y. Acad.-Sci., 68(1), pp. 201–208, Aug. 30, 1957.

Stefanini: Circulation, 12, pg. 779 (1955).

Stefanini et al.: J. Clin. Invest., 34, pg. 965, 1955.

Tagnon: "Practitioner," vol. 174, pp. 95–102, 1953.

Tillett et al.: J. Clinical Investigation, 34, pp. 169–185 (1955).

Varidase, Lederle Labs., 30 Rockefeller Plaza, N.Y., 52 pages, June 1951, pp. 5–6 pertinent.

FRANK CACCIAPAGLIA, JR., *Primary Examiner.*

MORRIS O. WOLK, *Examiner.*